(No Model.)

A. T. MILLS.
MILK SKIMMER

No. 401,197. Patented Apr. 9, 1889.

Witnesses
Jno. S. Finch Jr.
C. D. Davis

Inventor,
A. T. Mills.
By his Attorney
C. H. Alexander

UNITED STATES PATENT OFFICE.

ALBERT T. MILLS, OF LAC QUI PARLE, MINNESOTA.

MILK-SKIMMER.

SPECIFICATION forming part of Letters Patent No. 401,197, dated April 9, 1889.

Application filed November 27, 1888. Serial No. 291,960. (No model.)

*To all whom it may concern:*

Be it known that I, ALBERT T. MILLS, a citizen of the United States, residing at Lac Qui Parle, in the county of Lac Qui Parle and State of Minnesota, have invented certain new and useful Improvements in Milk-Skimmers, of which the following is a specification, reference being had therein to the accompanying drawings, in which—

Figure 1:
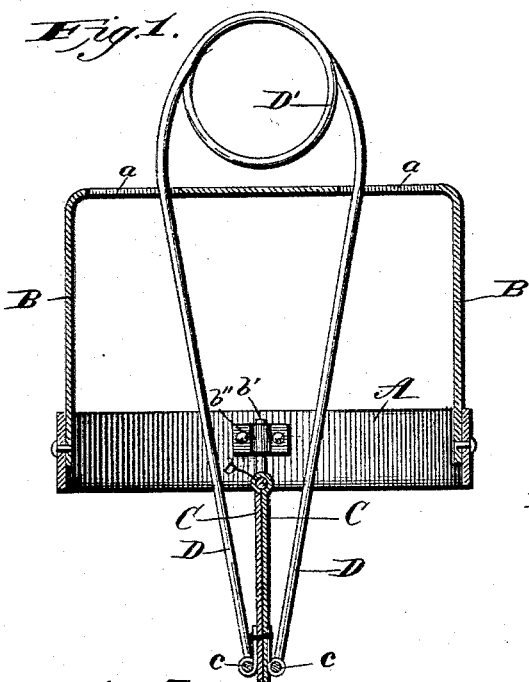
Figure 2:
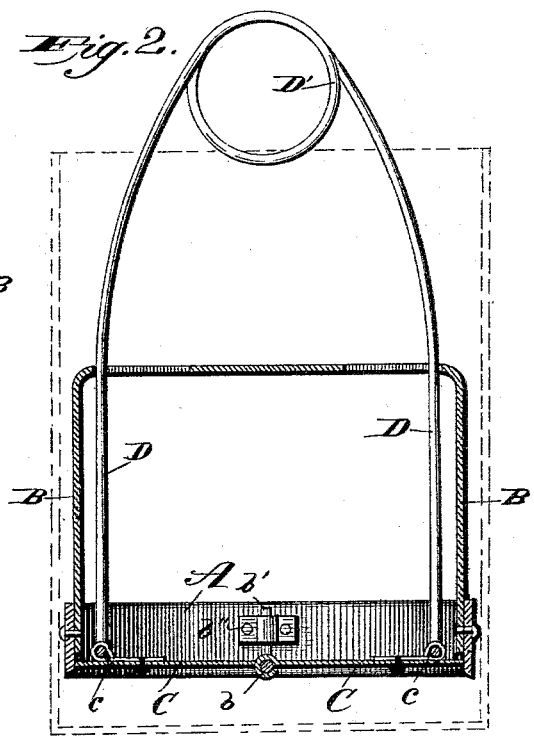
Figure 5:
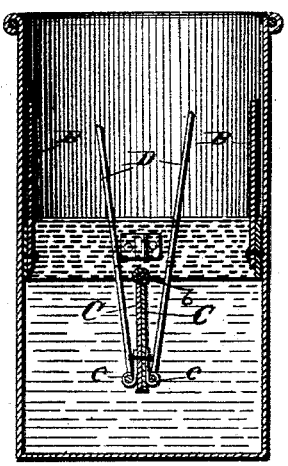
Figure 3:
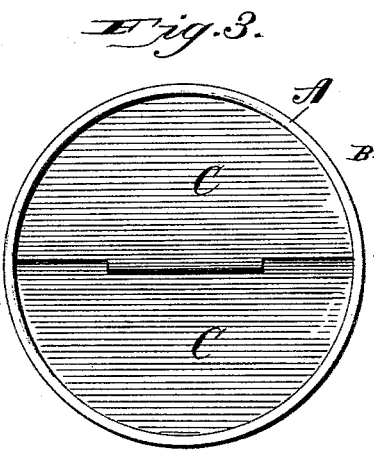
Figure 6:
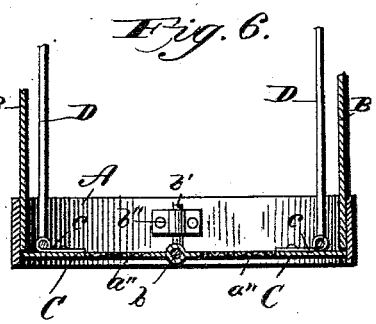

Figure 1 represents a vertical sectional view of my improved skimming device, the parts being in a position ready to be inserted in a milk-can; Fig. 2, a similar view of the skimmer inserted in a can ready to be lifted out; Fig. 3, a detail bottom view of the skimmer closed; and Fig. 4, a vertical sectional view of the lower portion of the skimmer, showing a slight modification of the same; Fig. 5, a vertical sectional view showing clearly the manner of using my device; Fig. 6, a detail view showing a modification of straining device.

The object of the invention is to provide an extremely simple and practical device that may be readily inserted in a can of milk to remove all the accumulated cream thereon in one operation, thus obviating the slow and imperfect process of skimming the milk by hand in the ordinary way, as will more fully hereinafter appear.

The invention consists in certain novel features of construction and arrangement of parts, that will be fully hereinafter described, and particularly pointed out in the claims appended.

Like letters of reference indicate corresponding parts in all the figures.

Figure 4:
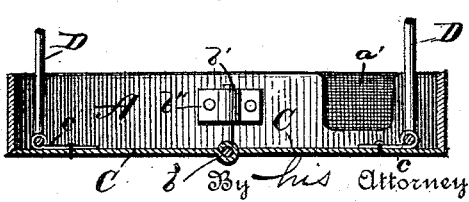

The letter A designates a band or ring of suitable width and diameter, which is adapted to fit loosely within the ordinary milk cans or jars. Riveted to or otherwise secured to this band are the two lower ends of a bail or handle, B, provided with two guiding-slots, $a$ $a$, in its upper portion. Extending entirely across the rim A near or on a line with its lower edge is a horizontal pivotal rod, $b$, the rod being provided with upward extensions $b'$ $b'$ at its ends, these extensions being securely fastened to the interior of the rim by means of clips $b''$. If it is desired to make this rod $b$ vertically adjustable, the clips may be fastened to the rim by means of screws instead of rivets, as shown in Figs. 2 and 4.

Upon the rod $b$ are pivotally hung the semicircular bottom sections, C C, the adjacent edges of these sections embracing the said rod and fitting against each other snugly, to prevent leakage of the cream when the sections are closed, as in Fig. 2. These sections are of such a diameter that when closed, as in Figs. 2 and 4, their circular or curved edges fit snugly within the band or rim A, to prevent escape of the cream. Instead of fitting the curved edges of the sections C within the rim A, as in Fig. 2, it is evident that I may so construct them as to cause them to bear upon the lower edge of the rim, as shown in Fig. 4. It is also evident that I may form an opening in the band A at any suitable point and stretch a fine screen or gauze across the same, as shown at $a'$ in Fig. 4, to permit the skimmed milk to run off and retain the cream. This provision in general, however, will not be necessary.

To operate and hold the sections C C in either one of their two positions, I provide two spring-actuated arms, D D, pivotally connected to the upper surfaces of the said sections near their circular edges by means of clips $c$ $c$, and guided in their movements by means of the slots $a$ $a$ in the bail B. These arms D D are connected together at their upper ends by means of a spring coil or loop, D', the constant tendency of which is to draw the said arms toward each other. I prefer to form the arms D and coil D' of a single piece of spring wire or rod, as shown. By thus causing the spring-arms D to press inwardly the bottom plates will be held in either one of their adjusted positions without the employment of catches, stops, or other means.

Before the skimmer is inserted in the creamery-can the rods D D are forced down, causing the bottom sections to assume a vertical position one against the other, as shown in Fig. 1. When in this position the device is inserted in the can and lowered until the lower edge of the rim A comes on a level with the lower edge of the stratum of cream, as shown in Fig. 5, when the bottom sections are drawn up or closed by means of the spring-rods D. The device may then be lifted out of the can and the cream emptied into a suitable vessel.

It will thus be observed that the cream may be readily removed from each of the cans at a single operation, doing away with ordinary method of skimming the milk, which is slow and tedious in comparison with my means.

In lieu of the opening $a'$ in the rim and covered with gauze, as shown in Fig. 4, it is evident that I may form openings in the bottom sections and cover the same with gauze, as shown at $a''$ in Fig. 6.

Having thus described my invention, what I claim, and desire to secure by Letters Patent, is—

1. In a milk-skimmer, the combination of a ring or band, A, a transverse rod, $b$, extended across the bottom of this band and provided with upturned ends $b'$, clips $b''$, for securing or clamping these upturned ends $b'$ against the interior of the said band, semicircular bottom plates, C C, pivoted upon the transverse rod $b$, the curved edges of these plates being adapted to fit within the said band A, and operating-rods pivoted to the said hinged bottom plates, substantially as and for the purpose herein set forth.

2. The combination of a rim or band provided with a suitable bail, a transverse rod secured to this rim, two semicircular bottom plates, C C, pivoted upon this rod, and the spring-actuated operating-rods, the normal tendency of these rods being to press inward, substantially as described.

3. The combination of a circular rim or band, a bail, B, secured to the rim and provided with slots $a\ a$, a stationary rod, $b$, secured to the said rim, two semicircular bottom plates pivoted upon this rod, spring-actuated rods D, attached to the said bottom plates and passing through the slots $a\ a$ in the bail, and a spring connected to these rods to press their lower ends inwardly, substantially as described.

4. In a milk-skimmer, the combination of a ring or band, a pivotal rod attached thereto, bottom plates pivotally attached to this rod, vertical operating-rods pivotally attached to these bottom plates, and a spring interposed between the upper ends of the said operating-rods and formed integral with the same, substantially as described.

In testimony whereof I affix my signature in presence of two witnesses.

ALBERT T. MILLS.

Witnesses:
C. W. PAIGE,
A. L. HIMLE.